United States Patent
Ramesh et al.

(10) Patent No.: US 7,114,064 B2
(45) Date of Patent: Sep. 26, 2006

(54) SYSTEM AND METHOD FOR ACCESSING AN ADVANCED CONFIGURATION AND POWER INTERFACE (ACPI) NAMESPACE NODAL TREE

(75) Inventors: Subramanian Ramesh, Plano, TX (US); Matthew Fischer, Plano, TX (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 671 days.

(21) Appl. No.: 10/294,888

(22) Filed: Nov. 14, 2002

(65) Prior Publication Data

US 2004/0098725 A1 May 20, 2004

(51) Int. Cl.
G06F 9/00 (2006.01)
G06F 9/24 (2006.01)
G06F 15/177 (2006.01)

(52) U.S. Cl. .......................................... 713/1; 717/132

(58) Field of Classification Search .................... 713/1, 713/2; 717/132, 133, 155–157; 719/311–332
See application file for complete search history.

(56) References Cited

U.S. PATENT DOCUMENTS

| 5,903,894 A * | 5/1999 | Reneris | 707/100 |
|---|---|---|---|
| 5,999,730 A * | 12/1999 | Lewis | 717/109 |
| 6,532,457 B1 * | 3/2003 | Tal et al. | 707/1 |
| 6,865,614 B1 * | 3/2005 | Fischer et al. | 709/246 |
| 2002/0091856 A1 * | 7/2002 | Brown | 709/238 |
| 2002/0133678 A1 * | 9/2002 | Mathews et al. | 711/153 |
| 2004/0062208 A1 * | 4/2004 | Brown et al. | 370/256 |
| 2005/0102294 A1 * | 5/2005 | Coldeway | 707/100 |

OTHER PUBLICATIONS

"Advanced Configuration and Power Interface Specification"; Revision 2.0a; Compaq Computer Corporation, Intel Corporation, Microsoft Corporation, Phoenix Technologies Ltd. and Toshiba Corporation; Mar. 31, 2002; 500 pages.

"ACPI Component Architecture Programmer Reference"; Revision 1.13; Core Subsystem, Debugger and Utilities; Intel; May 3, 2002; 154 pages.

"iASL Compiler User Reference"; Revision 1.01; Intel; May 3, 2002; 10 pages.

* cited by examiner

Primary Examiner—William Thomson
Assistant Examiner—Diem Cao (57) ABSTRACT

A system and method for accessing an Advanced Configuration and Power Interface (ACPI) namespace nodal tree in a computer platform employing an ACPI-compatible implementation is disclosed.

33 Claims, 5 Drawing Sheets

SYSTEM AND METHOD FOR ACCESSING AN ADVANCED CONFIGURATION AND POWER INTERFACE (ACPI) NAMESPACE NODAL TREE

TECHNICAL FIELD

The present disclosure generally relates to computer platforms employing Advanced Configuration and Power Interface (ACPI)-compatible implementations.

BACKGROUND

The ACPI specification is a computer architecture-related standard developed to establish industry common interfaces for enabling robust operating system (OS)-directed motherboard device configuration and power management of both devices and entire platforms. The ACPI specification evolves the existing collection of power management BIOS code, Advanced Power Management (APM) Application Program Interfaces (APIs), Plug and Play Basic Input/Output System (PNPBIOS) APIs, and Multiprocessor Specification (MPS) tables, into a well-defined, integrated power management and configuration interface specification. From a manufacturing and implementation perspective, the ACPI specification enables different computer platforms to implement common motherboard configuration and power management functions. From a power management perspective, it promotes the concept that platforms should conserve energy by transitioning unused devices into lower power states. For example, computer platforms employing ACPI-compatible implementations are able to optimize processor clock speed, control motherboard and peripheral device power consumption, and place an entire computer platform into a low-power or sleeping state.

Centralizing power management and related directives in the OS has made it practical and compelling for computer hardware implementations to support and exploit ACPI-defined interfaces. In general, to implement ACPI-defined interfaces and take advantage of the functionality offered by them, the ACPI-related modules are first systematically initialized and utilized by the OS via an ACPI namespace which provides a hierarchical tree structure in OS-controlled memory that contains named objects relating to hardware implementation and configuration details. In particular, during bootload, the OS accesses the ACPI namespace to load ACPI-hardware implementations. Similarly, during the operation of the computer platform, user space applications and kernel space applications implement ACPI-defined interfaces by accessing objects, such as package objects, control method objects, data objects, bus objects, and device objects, for example, in the ACPI namespace.

The existing ACPI architecture, however, is not without limitations. As the ACPI specification continues to become more accepted, the number of ACPI-compatible implementations continues to grow and the functionality of existing ACPI-implementations continues to increase. Accordingly, the number of objects in the ACPI namespace and the size of the ACPI namespace continues to expand. During hardware initialization and operation, the ACPI namespace is traversed to access a named object to initialize or utilize, respectively, a particular ACPI-compatible implementation. Due to the increasing size of the ACPI namespace, accessing named objects in the ACPI namespace for the initialization or operation of ACPI-compatible implementations consumes an increasing amount of system resources.

SUMMARY

A system and method for accessing an Advanced Configuration and Power Interface (ACPI) namespace nodal tree in a computer platform employing an ACPI-compatible implementation is disclosed. In an embodiment of the system, a namespace data structure is associated with the computer platform and stores the ACPI namespace nodal tree that includes at least one node. An index data structure includes at least one pointer pointing to an index node that spans a sub-tree of the ACPI namespace nodal tree. A traversing function is operable to commence a searching operation for a required ACPI object starting from the index node.

DETAILED DESCRIPTION OF THE DRAWINGS

Figure 1:
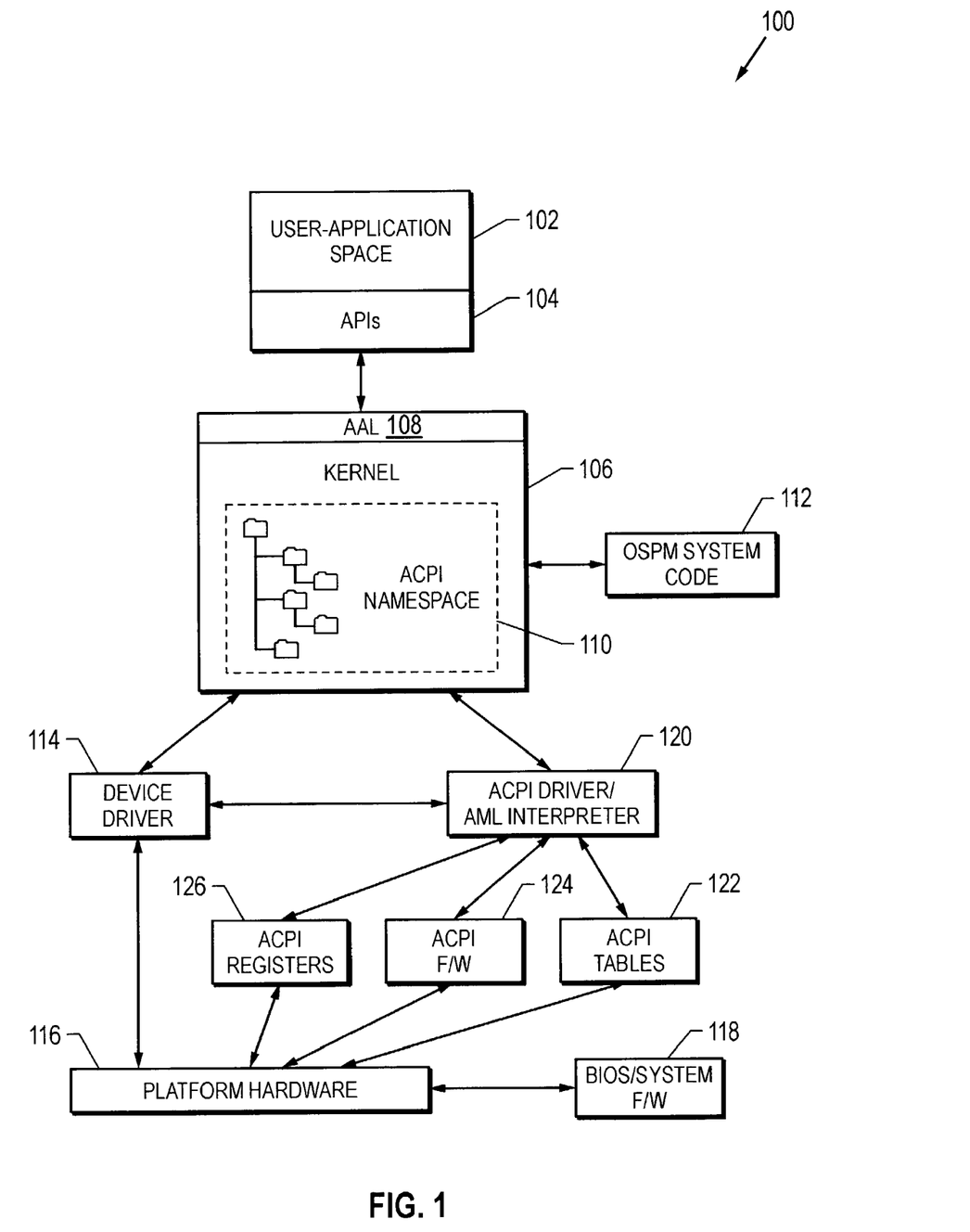
FIG. 1 depicts a functional block diagram of a computer platform having an ACPI-compatible implementation wherein a scheme for accessing an ACPI namespace nodal tree may be provided.

In the drawings, like or similar elements are designated with identical reference numerals throughout the several views thereof, and the various elements depicted are not necessarily drawn to scale. Referring now to FIG. 1, depicted therein is an embodiment of a computer platform 100 having an ACPI-compatible implementation wherein a scheme for traversing and accessing an ACPI namespace nodal tree may be provided. A user-space application or user-application space 102 employs Application Program Interfaces (APIs) 104 to provide a set of formalized software calls and routines that can be referenced by the user applications in the user-application space 102 to access underlying platform services provided by an operating system (OS) kernel space 106. The kernel space 106 includes system-level commands and functions for executing various memory management routines and scheduling programs, for example. An ACPI Access Layer (AAL) 108 wraps around the underlying ACPI interfaces as part of the kernel space 106 to provide an extension of the kernel whereby a system of multi-threaded access to an ACPI namespace nodal tree 110 can be effectuated. The ACPI namespace nodal tree 110 is stored within a database structure of the kernel space 106 and forms an integral part of the ACPI specification. As previously discussed, the ACPI namespace nodal tree 110 provides a hierarchical tree structure that contains a number of nodes or named objects including package objects which refer to other objects, data objects, control method objects, bus objects, and device objects, for example.

Operating System-directed Power Management (OSPM) code 112 provides instructions for executing a model of power and system management wherein the OS kernel space 106 plays a central role and uses global information to optimize platform behavior for the task at hand. A device driver 114 provides the necessary software components that permit communication with platform hardware devices 116 including components such as liquid crystal displays (LCD) panels, video adapters, integrated drive electronics (IDEs), CD-ROMs, hard disk controllers, and other ACPI-compatible hardware implementations that make up at least a portion of the computer platform 100. A BIOS/system firmware 118 offers a set of essential software routines that test the platform hardware devices 116 at startup, invoke the OS, and support the transfer of data among various platform hardware devices 116.

The OSPM code 112 uses an ACPI Driver/ACPI Machine Language (AML) interpreter 120 to execute procedures stored in a block of ACPI system description tables 122 which describe the interfaces to the platform hardware devices 116. Some descriptions in the ACPI system description tables 122 may limit the hardware that can be built. Most descriptions, however, allow the hardware to be built in variable ways and provide the necessary operation sequences required to make the hardware function. The ACPI system description tables 122 may contain definition blocks employing a byte-code type of language which is interpreted by the ACPI driver/AML interpreter 120. The definition blocks contain information about hardware implementation and configuration details in the form of data and control methods. At a minimum, the ACPI system description tables 122 of the computer platform 100 include what is known as a "differentiated definition block" which describes the base system. Typically, the ACPI system description tables 122 will include other definition blocks relating to power management structures, such as device power states, for example.

ACPI system firmware 124 provides code that boots the computer platform upon power-up and provides interfaces for sleep, wake, and restart operations. ACPI registers 126 are operable to store configuration constraints, parameters, etc. associated with the hardware interfaces that are described by the ACPI system description tables 122. Together, the ACPI system description tables 122, ACPI firmware 124, and ACPI registers 126 provide ACPI-interfaces that enable robust OSPM functionality intended for industry-wide adoption so as to encourage hardware and software vendors to build ACPI-compatible implementations. It should therefore be appreciated that the ACPI-defined interfaces, OSPM functionality and broader concepts defined therein are suitable to all classes of computers including desktops, laptops, mobiles, handhelds, appliance PCs, workstations, and server machines, for example.

Although a specific ACPI structure is presented in FIG. 1, it should be recognized that the structure may be modified to incorporate other ACPI-defined interfaces and appropriate hardware specifications that are particular to a certain design or computer platform. For example, the functionality of the blocks of FIG. 1 can be combined in any known fashion. In one embodiment, the functionalities of the BIOS/system firmware 118 and the ACPI firmware 124 may be combined.

Typically, the ACPI namespace nodal tree 110 is created early in the initialization process when the OS kernel space 106 loads and/or unbundles definition blocks from the ACPI system description tables 122. As ACPI services are fundamental to the kernel, the ACPI namespace nodal tree may be constructed right after bootloader and low level kernel initialization and before other OS initialization operations such as starting a system resource manager. After the ACPI namespace nodal tree 110 is initialized, ACPI hardware is initialized. As a part of the hardware initialization step, hardware is discovered, and System Control Interrupts (SCIs), General Purpose Event (GPE) handling, and fixed event handling are configured. To complete the hardware discovery process, the ACPI namespace nodal tree 110 may be accessed for hardware. In one embodiment, hardware devices are discovered in a hierarchical fashion, e.g., all processors are discovered, then bus adaptors are discovered, and finally Platform Dependent Hardware (PDH) is discovered. Following the completion of the hardware initialization process, the computer platform 100 completes the platform-wide initialization process and continues into an operational mode wherein the ACPI namespace nodal tree 110 may be accessed by the user application space 102 and kernel space 106 in order to perform hardware tasks such as determining the status of a hardware device or installing a new hardware device. The present invention provides a scheme that employs an ACPI namespace index data structure and associated traversing functionality to substantially reduce the search space when the ACPI namespace nodal tree 110 is accessed during initialization or operation.

Figure 2:
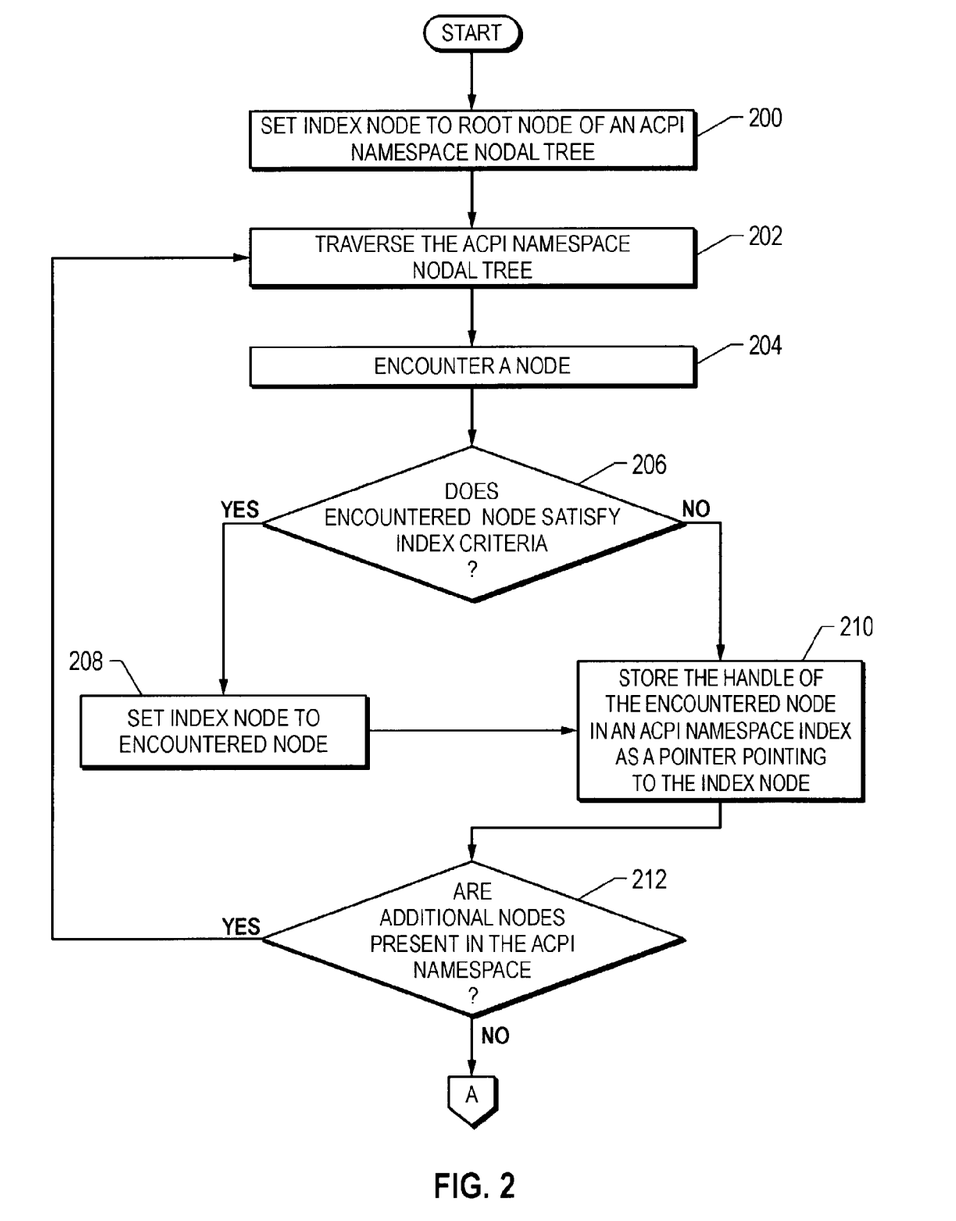
FIG. 2 depicts a flow chart illustrating a method for constructing an ACPI namespace index.

FIG. 2 depicts a method for constructing an ACPI namespace index employed in an embodiment of the present invention. At block 200, an index node is set to the root node of an ACPI namespace nodal tree. Alternatively, the default node may be any node on the ACPI namespace nodal tree. Thereafter, a traversing function traverses the ACPI namespace nodal tree having multiple nodes (block 202). Upon encountering a node (block 204), a determination is made whether the encountered node satisfies one or more index criteria (decision block 206). If so, the process advances to block 208, wherein the index node is set to the encountered node. If the encountered node does not satisfy the index criteria, however, then the process advances to block 210. The index criteria are operable to provide an indicator of the hierarchical location or sub-tree location where a node may be found. Any object on the ACPI namespace tree may be an indexable nodal object provided the object satisfies the index criteria. In general, an index node is a node that includes one or more objects in a sub-tree starting at the node, i.e., spanned by the node. For example, the index criteria may be designed to include package objects, processor objects, power resource objects, bus objects, device objects, data objects, or control method objects. Alternatively, the index criteria may be designed to include more than one type of object. It should be appreciated that the index criteria may be programmable and flexible and can be designed to encompass any selection of nodes on the ACPI namespace tree. For example, the index criteria may include only certain types of nodes, such as cellular package objects or processor objects.

At block 210, the encountered node's handle is stored in an ACPI namespace index data structure as a pointer pointing to the index node. For example, in one embodiment, each cellular object is an indexable nodal object and the handle of each node of the ACPI namespace nodal tree is stored in the index data structure as a pointer pointing to its respective cell. In this embodiment, a traversing function may access each node by commencing an ACPI namespace walk at the node's cell (i.e., the node's cell index), instead of commencing every ACPI namespace walk at the root directory. Consequently, the present invention reduces the search space and system resources involved in accessing a node of the ACPI namespace nodal tree. At decision block 212, if additional nodes or objects are present in the ACPI namespace nodal tree, the process returns to block 202 as illustrated by the return flow arrow. If additional nodal objects are not present, the computer platform may complete the initialization process and proceed to an operational mode wherein when a request to access an object of the ACPI namespace nodal tree is made, the illustrated method may proceed to the flow chart depicted in FIG. 3 as represented by advancement block A.

Figure 3:
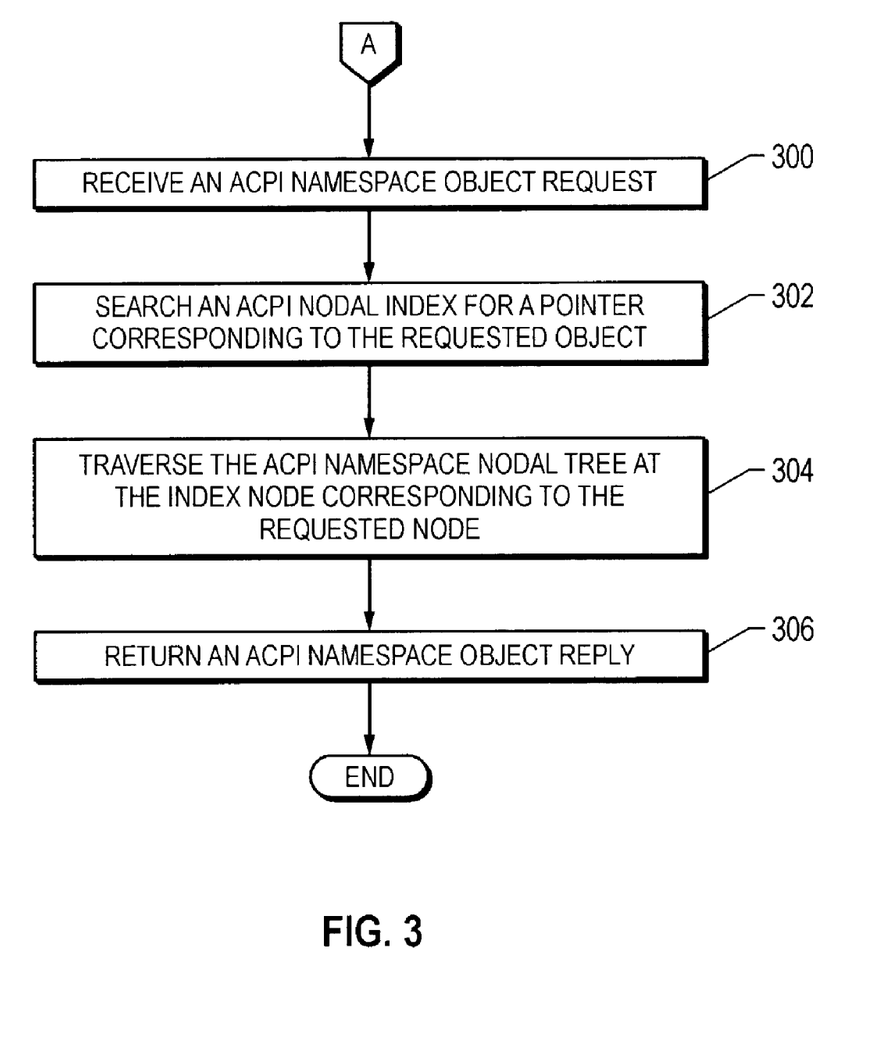
FIG. 3 depicts a flow chart illustrating one embodiment of a method for accessing an ACPI namespace nodal tree.

FIG. 3 depicts one embodiment of a method for accessing an ACPI namespace nodal tree. At block 300, an ACPI namespace object request is received by a kernel space. At block 302, an ACPI nodal index data structure is searched for a pointer corresponding to the requested object. The pointer may point to an index node that spans a sub-tree containing the requested object or the pointer may point to the requested object itself. It should be appreciated that the depth of the index data structure, i.e., the number of index nodes contained in the index, is an optimization of multiple factors including the overhead involved with having a greater number of index nodes and the savings in system resources the index provides. At block 304, a traversing function begins traversing the ACPI namespace nodal tree at the index node corresponding to the requested object. At block 306, the requested object is found and an ACPI namespace object reply is returned. Accordingly, as alluded to in the foregoing discussion, the present invention reduces the search/access time for a nodal search by commencing at a sub-tree spanned by an index node rather than the root-directory, which necessitates traversing the entire tree.

Figure 4:
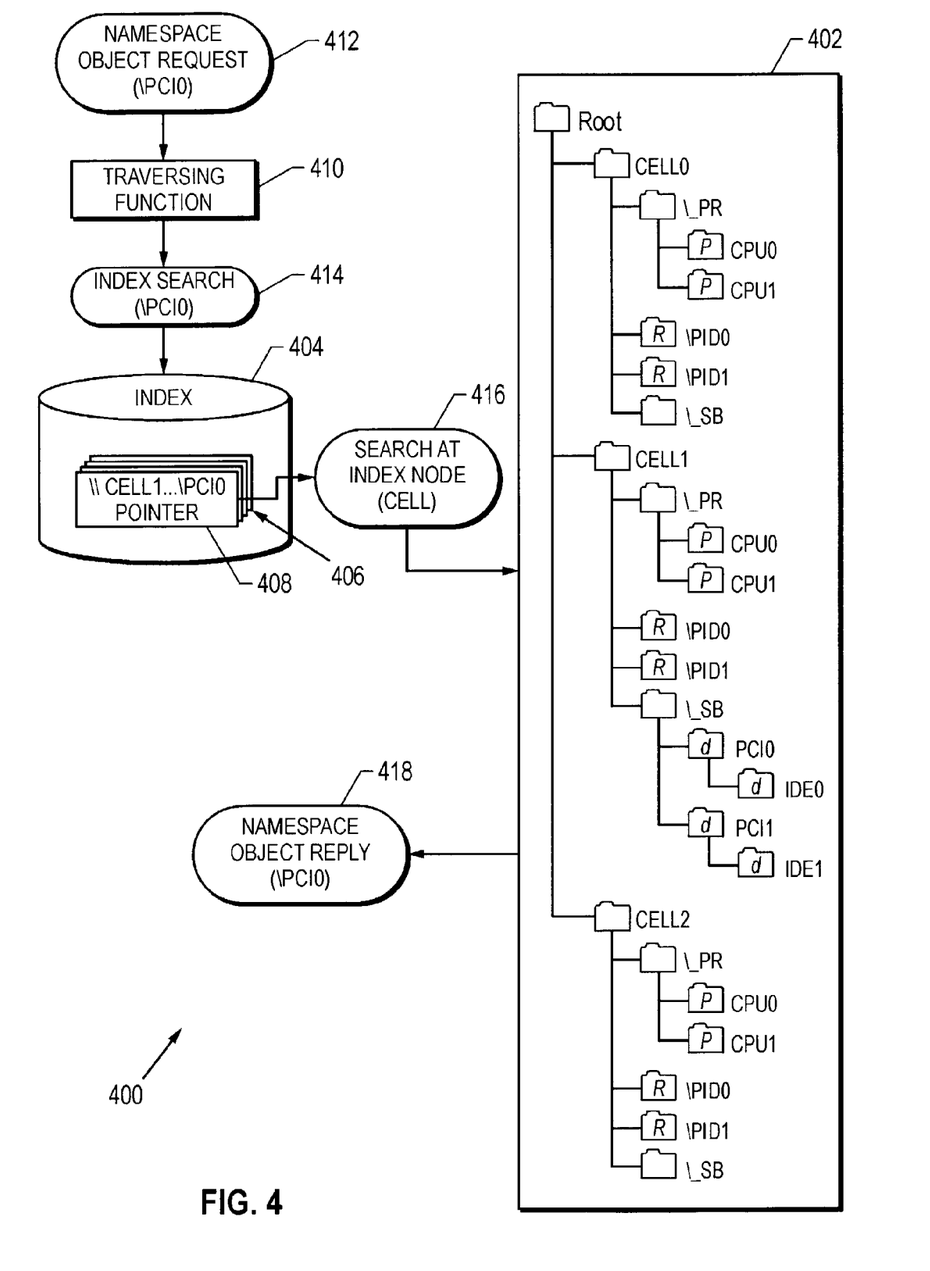
FIG. 4 depicts a schematic diagram illustrating one embodiment of a system for traversing an ACPI namespace nodal tree.

FIG. 4 depicts one embodiment of a system 400 for traversing and accessing an ACPI namespace nodal tree 402. As depicted, ACPI namespace nodal tree 402 reflects a multi-cellular, multi-processor computer platform that includes multiple nodes such as a PCI bus object (PCI0) node and an IDE device object (IDE0) node. Under the root directory (Root), the namespace nodal tree includes three cellular object nodes (Cell0, Cell1, Cell2). The Cell0 object includes a processor tree package (\_PR) and a system bus tree package (\_SB). Each package refers to and contains a set of objects. For example, the processor tree package (\_PR) contains two processor objects (CPU0, CPU1) that contain data and instructions relating to a specific processor. Additionally, two power resource objects (\PID0, \PID1) are positioned within Cell0.

Cell1 and Cell2 include objects similar to the objects of Cell0. As illustrated, however, the \_SB object of Cell1 is expanded and includes two bus objects (PCI0, PCI1), each having a device object (IDE0 and IDE1 respectively). Those skilled in the art will recognize that the illustrated ACPI namespace nodal tree 402 is presented in a truncated form. For example, in a non-truncated tree, the \PID0 object may include a status control method object (_STA) that evaluates the state of the power resource and returns a value indicative of the state. Furthermore, a GPE package (\_GPE) may be present that includes multiple control method objects (e.g., _L01, _E02, _L03) that are associated with the handling of GPEs.

An index data structure 404 includes a mapping of index nodes with a set of pointers 406 that correspond to the nodes of the ACPI namespace nodal tree 402. In the illustrated embodiment, cellular objects, i.e., Cell0, Cell1, and Cell2, are indexable nodal objects since each of them spans a corresponding sub-tree. For example, pointer 408 corresponds to the PCI0 node of the Cell1 object and points to the index node of the PCI0 object, which is the Cell1 object. Similarly, a pointer for the CPU1 object of the \_PR object of the sub-tree spanned by Cell0 points to the Cell0 nodal object and a pointer for the \_SB object contained in the sub-tree spanned by Cell2 points to the Cell2 nodal object.

A traversing function 410 is operable to traverse the ACPI namespace nodal tree 402 in response to receiving a namespace object request such as namespace object request 412 which requests access to an object, e.g., the PCI0 object of the Cell1 nodal index object. Upon receiving the request 412, the traversing function 410 initiates an index search operation 414 with respect to the data structure 404, for a pointer corresponding to the handle of the PCI0 object contained in the sub-tree of the Cell1 node. Upon finding pointer 408, the traversing function 410 begins a sub-tree search 416 of the ACPI namespace nodal tree 402 starting from Cell1. In one implementation, the traversing function 410 may traverse the ACPI namespace nodal tree 402 or its sub-trees in a recursive depth-first fashion.

Upon locating the \PCI0 object of Cell1, the traversing function returns a namespace object reply 418. In the illustrated embodiment of the present invention, accessing the \PCI0 object of Cell1 involved an ACPI namespace walk of seven steps, i.e., Cell1 →\_PR →\CPU0 →\CPU1 →\PID0 →\PID1 →\_SB →\PCI0. On the other hand, using current techniques, accessing the \PCI0 object would require an ACPI namespace walk of 15 steps, i.e., Root →Cell0 →\_PR →\CPU0 →\CPU1 →\PID0 →\PID1 →\_SB →Cell1 →\_PR →\CPU0 →\CPU1 →\PID0 →\PID1 →\_SB →\PCI0. It should therefore be appreciated that the savings in system resources that the present invention provides can be particularly significant in multi-cellular, multi-processor systems wherein the number of ACPI-compatible hardware devices, and therefore the size of the ACPI namespace nodal tree, is great. Further, although a particular type of package object, i.e., cellular objects, is depicted as an indexable nodal object, it should be recognized that any object or module device in the nodal tree may be an indexable nodal object.

Figure 5:
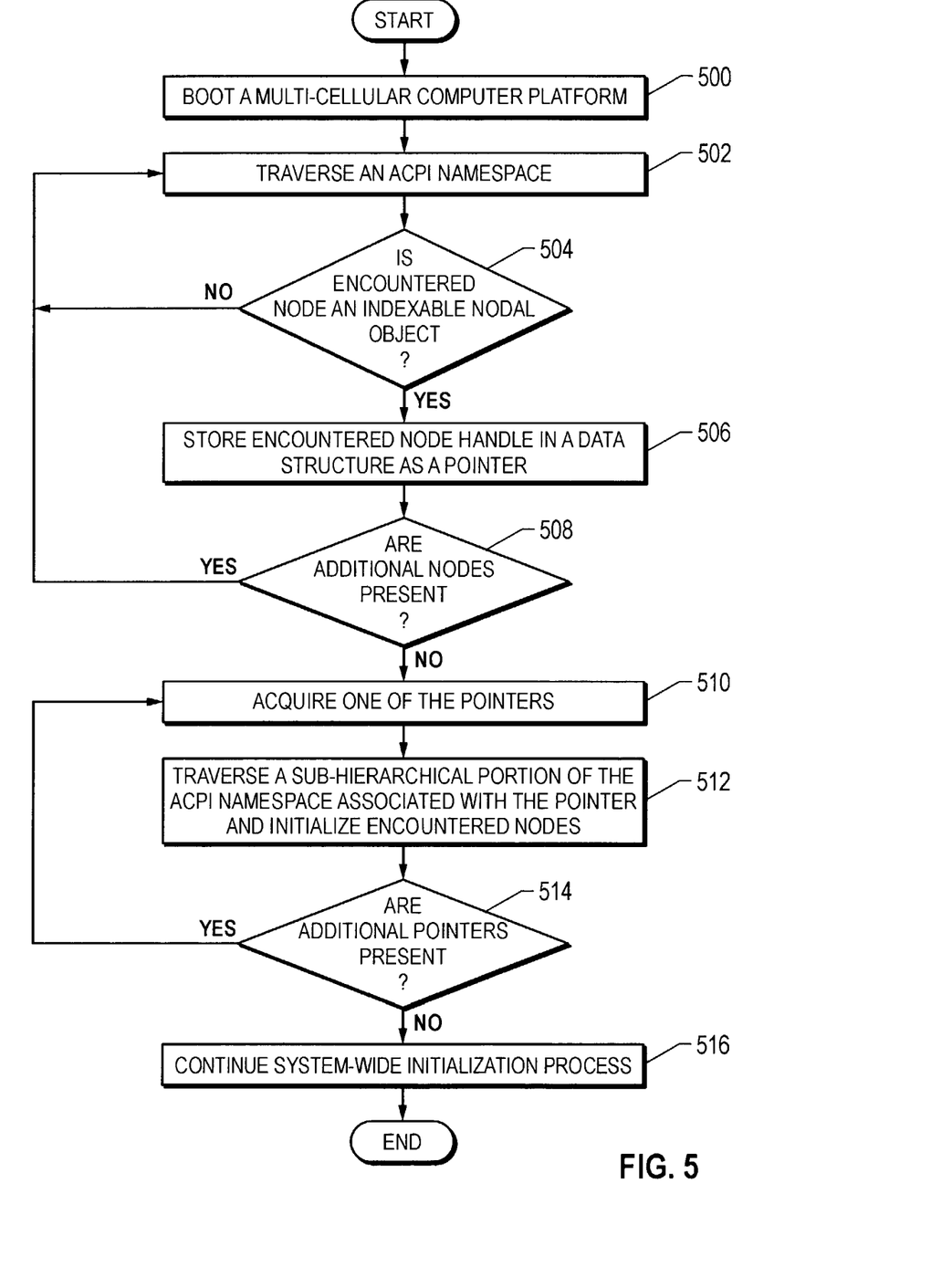
FIG. 5 depicts a flow chart illustrating one embodiment of a method for initializing a computer platform having an ACPI-compatible implementation.

FIG. 5 depicts one embodiment of a method for initializing (i.e., caching) an ACPI namespace nodal tree. At block 500, a multi-cellular, multi-processor computer platform is booted. As a part of the initialization process, an ACPI namespace nodal tree that has been unbundled is traversed (block 502). At decision block 504, if an encountered node is an indexable nodal object, then the process advances to block 506, wherein the handle of the encountered node is stored in an array as a pointer. If the encountered node is not an indexable nodal object, however, the process returns to block 502 as illustrated by the return flow arrow. Further, if additional nodes are present, then the process returns to block 502 in order to capture all the indexable nodes of the ACPI-namespace tree (decision block 508). Upon completion of indexing all indexable nodes, the process advances to block 510 wherein one of the pointers stored in the array at block 506 is acquired. At block 512, a traversing function traverses a sub-hierarchical portion (i.e., a sub-tree) of the ACPI namespace associated with the pointer. Additionally, at this time, any encountered nodes are initialized (i.e., handles are mapped to applicable index pointers). This process continues until all index pointers are mapped to their respective sub-tree nodal objects (decision block 514). Thereafter, the flow proceeds to block 516 wherein the system-wide initialization process is continued.

In one system implementation, ACPI-compatible devices and sub-systems are discovered and initialized during the booting of a multi-cellular multi-processor machine. The hardware is initialized in a cellular hierarchical fashion, e.g., within each cell, hardware is discovered in the following order: processors, memory, and PDH. In this arrangement, the cellular objects are indexable nodal objects and a traversing function walks the ACPI namespace nodal tree searching for cells. Each cell that is found serves as a nodal index, or a point of reference for future walks that is stored in a data structure. After finding each of the cells, the traversing function searches each cell for further hardware. Using the schemes disclosed herein, the hierarchical nature of the ACPI namespace nodal tree is leveraged to minimize the search space required to discover and initialize hardware.

Although the invention has been particularly described with reference to certain illustrations, it is to be understood that the forms of the invention shown and described are to be treated as exemplary embodiments only. Various changes, substitutions and modifications can be realized without departing from the spirit and scope of the invention as defined by the appended claims.

What is claimed is:

1. A system for accessing an Advanced Configuration and Power Interface (ACPI) namespace nodal tree in a computer platform employing an ACPI-compatible implementation, comprising:
 a namespace data structure operably associated with said computer platform, said namespace data structure having said ACPI namespace nodal tree with at least one node;
 an index data structure operably associated with said computer platform, said index data structure including at least one pointer pointing to an index node that spans a sub-tree of said ACPI namespace nodal tree, wherein said ACPI namespace nodal tree remains unmodified; and
 a traversing function operable to commence a searching operation responsive to a namespace object request with respect to a node in said ACPI namespace nodal tree, wherein said traversing function commences said searching operation from an intermediary index node instead of starting from a root node of said ACPI namespace nodal tree, said intermediary index node being pointed to by a pointer obtained from searching said index data structure.

2. The system as recited in claim 1, wherein said namespace data structure having said ACPI namespace nodal tree is associated with said computer platform's kernel space.

3. The system as recited in claim 1, wherein said index data structure is associated with said computer platform's kernel space.

4. The system as recited in claim 1, wherein said node is a sub-hierarchical element of said index node.

5. The system as recited in claim 1, wherein said node and said index node are identical nodes.

6. The system as recited in claim 1, wherein said traversing function is associated with said computer platform's kernel space.

7. The system as recited in claim 1, wherein said traversing function is operable to traverse said kernel ACPI namespace nodal tree in a recursive depth-first fashion.

8. The system as recited in claim 1, wherein said node is selected from package objects, cellular objects, processor objects, power resource objects, bus objects, device objects, data objects, and control method objects.

9. The system as recited in claim 1, wherein said index node is selected from package objects, cellular objects, processor objects, power resource objects, bus objects, device objects, data objects, and control method objects.

10. A method for accessing an Advanced Configuration and Power Interface (ACPI) namespace nodal tree in a computer platform employing an ACPI-compatible implementation, comprising:
 receiving a request for an ACPI namespace object;
 searching an index data structure for a pointer associated with said ACPI namespace object, said pointer pointing to an index node indicative of said ACPI namespace object's hierarchical location in said ACPI namespace nodal tree, wherein said ACPI namespace nodal tree remains unmodified; and
 traversing said ACPI namespace nodal tree starting at said index node instead of starting from a root node of said ACPI namespace nodal tree.

11. The method as recited in claim 10, wherein the operation of traversing said ACPI namespace nodal tree further comprises traversing said ACPI namespace nodal tree in a recursive depth-first fashion.

12. The method as recited in claim 10, wherein the operation of traversing said ACPI namespace nodal tree further comprises encountering node elements selected from package objects, cellular objects, processor objects, power resource objects, bus objects, data objects, and control method objects, said node elements forming a subtree spanned by said index node.

13. The method as recited in claim 10, wherein said index node is selected from package objects, cellular objects, processor objects, power resource objects, bus objects, data objects, and control method objects.

14. The method as recited in claim 10, wherein said requested object is a sub-hierarchical element of said index node.

15. The method as recited in claim 10, wherein said requested object and said index node are identical nodes.

16. The method as recited in claim 10, wherein said index data structure is associated with said computer platform's kernel space.

17. A method for initializing a computer platform employing an ACPI-compatible implementation, comprising:
 traversing an ACPI namespace nodal tree operably associated with said computer platform and identifying at least one indexable nodal object;
 for said at least one indexable nodal object, storing said indexable nodal object's handle as a pointer in a data structure;
 traversing a sub hierarchical portion of said ACPI namespace nodal tree associated with said pointer, wherein said ACPI namespace nodal tree remains unmodified; and
 initializing at least one encountered node of said sub-hierarchical portion.

18. The method as recited in claim 17, wherein said operation of traversing said ACPI namespace nodal tree further comprises traversing said ACPI namespace nodal tree in a recursive depth-first fashion.

19. The method as recited in claim 17, wherein said at least one encountered node is selected from package objects, cellular objects, processor objects, power resource objects, bus objects, data objects, and control method objects.

20. The method as recited in claim 17, wherein said at least one indexable nodal object is selected from package objects, cellular objects, processor objects, power resource objects, bus objects, data objects, and control method objects.

21. The method as recited in claim 17, wherein said operation of traversing said sub-hierarchical portion of said ACPI namespace nodal tree further comprises traversing said sub-hierarchical portion of said ACPI namespace nodal tree, in a recursive depth-first fashion.

22. An apparatus for accessing an Advanced Configuration and Power Interface (ACPI) namespace nodal tree in a computer platform employing an ACPI-compatible implementation, comprising:

means for receiving a request for an ACPI namespace object;

means for searching an index data structure for a pointer associated with said ACPI namespace object, said pointer pointing to an index node indicative of said ACPI namespace object's hierarchical location in said ACPI namespace nodal tree, wherein said ACPI namespace nodal tree remains unmodified; and     means for traversing said ACPI namespace nodal tree starting at said index node instead of starting from a root node of said ACPI namespace nodal tree.

23. The apparatus as recited in claim 22, wherein said means for traversing said ACPI namespace nodal tree further comprises means for traversing said ACPI namespace nodal tree in a recursive depth-first fashion.

24. The apparatus as recited in claim 22, wherein said means for traversing said ACPI namespace nodal tree is operable to encounter node elements selected from package objects, cellular objects, processor objects, power resource objects, bus objects, data objects, and control method objects, said node elements forming a subtree spanned by said index node.

25. The apparatus as recited in claim 22, wherein said index node is selected from package objects, cellular objects, processor objects, power resource objects, bus objects, data objects, and control method objects.

26. The apparatus as recited in claim 22, wherein said requested object is a sub-hierarchical element of said index node.

27. The system as recited in claim 22, wherein said requested object and said index node are identical nodes.

28. The apparatus as recited in claim 22, wherein said index data structure is associated with said computer platform's kernel space.

29. A system for initializing a computer platform employing an ACPI-compatible implementation, comprising:

means for traversing an ACPI namespace nodal tree operably associated with said computer platform and identifying at least one indexable nodal object;

means for storing a handle associated with said at least one indexable nodal object as a pointer in a data structure;

means for traversing a sub-hierarchical portion of said ACPI namespace nodal tree associated with said pointer, wherein said ACPI namespace nodal tree remains unmodified; and     means for initializing at least one encountered node of said sub-hierarchical portion.

30. The system as recited in claim 29, wherein said means for traversing said ACPI namespace nodal tree further comprises means for traversing said ACPI namespace nodal tree in a recursive depth-first fashion.

31. The system as recited in claim 29, wherein said at least one encountered node is selected from package objects, cellular objects, processor objects, power resource objects, bus objects, data objects, and control method objects.

32. The system as recited in claim 29, wherein said at least one inexpiable nodal object is selected from package objects, cellular objects, processor objects, power resource objects, bus objects, data objects, and control method objects.

33. The system as recited in claim 29, wherein said means for traversing said sub-hierarchical portion of said ACPI namespace nodal tree further comprises means for traversing said sub-hierarchical portion of said ACPI namespace nodal tree in a recursive depth-first fashion.

\* \* \* \* \*

UNITED STATES PATENT AND TRADEMARK OFFICE
CERTIFICATE OF CORRECTION

PATENT NO. : 7,114,064 B2
APPLICATION NO. : 10/294888
DATED : September 26, 2006
INVENTOR(S) : Subramanian Ramesh et al.

It is certified that error appears in the above-identified patent and that said Letters Patent is hereby corrected as shown below:

In column 8, line 20, in Claim 12, delete "subtree" and insert -- sub-tree --, therefor.

In column 8, line 43, in Claim 17, delete "sub hierarchical" and insert -- sub-hierarchical --, therefor.

In column 8, line 67, in Claim 21, delete "tree," and insert -- tree --, therefor.

In column 9, line 25, in Claim 24, delete "subtree" and insert -- sub-tree --, therefor.

In column 10, line 27, in Claim 32, delete "inexpiable" and insert -- indexable --, therefor.

Signed and Sealed this

Twenty-eighth Day of July, 2009

JOHN DOLL
*Acting Director of the United States Patent and Trademark Office*